(12) United States Patent  
Dunstan

(10) Patent No.: US 9,021,202 B2
(45) Date of Patent: *Apr. 28, 2015

(54) DELIVERING SECURED MEDIA USING A PORTABLE MEMORY DEVICE

(75) Inventor: Robert Dunstan, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 298 days.

This patent is subject to a terminal disclaimer.

(21) Appl. No.: 12/655,576

(22) Filed: Dec. 31, 2009

(65) Prior Publication Data

US 2010/0161889 A1    Jun. 24, 2010

Related U.S. Application Data

(63) Continuation of application No. 11/965,278, filed on Dec. 27, 2007, now abandoned.

(51) Int. Cl.
*G06F 12/14* (2006.01)
*G06F 3/06* (2006.01)
*G06F 21/10* (2013.01)
*G06F 21/78* (2013.01)

(52) U.S. Cl.
CPC .......... *G06F 12/1433* (2013.01); *G06F 3/0679* (2013.01); *G06F 21/10* (2013.01); *G06F 21/78* (2013.01); *G06F 2212/2022* (2013.01); *G06F 2221/0748* (2013.01); *G06F 2221/2107* (2013.01); *G06F 2221/2119* (2013.01); *G06F 2221/2153* (2013.01)

(58) Field of Classification Search
CPC ............................... G06F 3/0679; G06F 21/78

USPC .................................................. 711/115, 163
See application file for complete search history.

(56) References Cited

U.S. PATENT DOCUMENTS

| | | | |
|---|---|---|---|
| 5,557,771 A | 9/1996 | Kawaguchi et al. | |
| 5,897,658 A | 4/1999 | Eskesen et al. | |
| 6,834,333 B2* | 12/2004 | Yoshino et al. | 711/163 |
| 7,539,307 B2 | 5/2009 | Lotspiech et al. | |
| 7,624,249 B2 | 11/2009 | O'Connor | |

(Continued)

FOREIGN PATENT DOCUMENTS

| | | |
|---|---|---|
| CN | 2249922 Y | 3/1997 |
| JP | 2001-166966 A | 6/2001 |

(Continued)

OTHER PUBLICATIONS

International Preliminary Report on Patentability received for PCT Patent Application No. PCT/US2008/084631, mailed on Jul. 8, 2010, 6 pages.

(Continued)

*Primary Examiner* — Than Nguyen
(74) *Attorney, Agent, or Firm* — International IP Law Group, P.L.L.C.

(57) ABSTRACT

In some embodiments an interface of a portable memory device is used to store content information in a hidden memory region of the portable memory device. The interface is also used to store information in a visible memory region of the portable memory device. The information stored in the visible memory region allows the content information stored in the hidden memory region to be accessed. Other embodiments are described and claimed.

49 Claims, 5 Drawing Sheets

(56) References Cited

U.S. PATENT DOCUMENTS

| | | | |
|---|---|---|---|
| 7,650,458 B2* | 1/2010 | Rogers et al. | 711/103 |
| 7,975,105 B1* | 7/2011 | Sun et al. | 711/115 |
| 2004/0003191 A1 | 1/2004 | Minne | |
| 2004/0215909 A1 | 10/2004 | Imai et al. | |
| 2005/0111663 A1 | 5/2005 | Lotspiech et al. | |
| 2005/0256997 A1 | 11/2005 | Koren et al. | |
| 2006/0104238 A1* | 5/2006 | Hibino | 370/328 |
| 2006/0161716 A1* | 7/2006 | Lin | 710/313 |
| 2006/0206397 A1 | 9/2006 | Shear et al. | |
| 2006/0214005 A1 | 9/2006 | Agami et al. | |
| 2006/0253620 A1* | 11/2006 | Kang | 710/36 |
| 2006/0288182 A1 | 12/2006 | Chou et al. | |
| 2007/0113097 A1* | 5/2007 | Wang | 713/186 |
| 2008/0034173 A1* | 2/2008 | Lavin | 711/159 |
| 2009/0006724 A1 | 1/2009 | Chang et al. | |
| 2011/0103378 A1* | 5/2011 | Brorsbol | 370/352 |
| 2011/0153879 A1* | 6/2011 | Chen | 710/30 |
| 2012/0089699 A1* | 4/2012 | Cholas | 709/217 |

FOREIGN PATENT DOCUMENTS

| | | |
|---|---|---|
| JP | 2002-132583 A | 5/2002 |
| JP | 2004-199138 A | 7/2004 |
| JP | 2004-295352 A | 10/2004 |
| JP | 2004-295405 A | 10/2004 |
| JP | 2004-326278 A | 11/2004 |
| JP | 2008541219 A | 11/2008 |
| JP | 2009-506390 A | 2/2009 |
| TW | 486913 B | 5/2002 |
| WO | 2006/008986 A1 | 1/2006 |
| WO | 2006/100669 A2 | 9/2006 |
| WO | 2006/121251 A1 | 11/2006 |
| WO | 2007/125848 A1 | 11/2007 |
| WO | 2009/085497 A1 | 7/2009 |

OTHER PUBLICATIONS

Office Action received for German Patent Application No. 112008003509.1, mailed on Jan. 31, 2011, 3 pages.

International Search Report and Written Opinion, received for PCT Application No. PCT/US2008/084631, mailed on Apr. 30, 2009, 11 pages.

Office Action received for United Kingdom Patent Application No. 1010829.8, mailed on Mar. 14, 2012, 3 pages.

Office Action received for Japanese Patent Application 2010-540705, mailed on Jan. 31, 2012, 2 pages of Office Action including 1 page of English Translation.

Office Action received for Chinese Application No. 200880124054, mailed Feb. 21, 2012, English translation, 4 pages.

Office Action received for Japanese Patent Application No. 2010-540705, mailed on May 29, 2012, 7 pages of Office Action including 4 pages of English Translation.

Office Action received for United Kingdom Patent Application No. 1211760.2, mailed on Feb. 6, 2013, 2 pages of Office Action.

Search Report and Examination Report received for United Kingdom Patent Application No. 1211760.2, mailed on Sep. 24, 2012, 4 pages.

Office Action received for Taiwan Patent Application No. 97147638, mailed on Oct. 25, 2012, 7 pages of Office Action including 1 page of English Translation of search report only.

Office Action received for Taiwan Patent Application No. 97147638, mailed on Oct. 7, 2013, 10 pages of Office Action including 1 page of English Translation of search report only.

Office Action received for Chinese Patent Application No. 200880124054.1, mailed on Jan. 4, 2013, 11 Pages including 6 Pages of English Translation.

Notice of Grant received for Chinese Patent Application No. 200880124054.1, mailed on Jun. 4, 2013, 6 Pages of Notice of Grant and 2 Pages of English Translation.

Notice of Grant received for Japanese Patent Application No. 2010-540705, mailed on Nov. 6, 2012, 1 page of Notice of Grant and 2 pages of Partial English Translation.

Office Action received for Japanese Patent Application No. 2012-214939, mailed on Apr. 1, 2014, 6 pages of Office Action including 3 pages of English Translation.

Office Action received for Japanese Patent Application No. 2012-214939, mailed on Dec. 3, 2013, 4 pages of Office Action including 2 pages of English Translation.

Notice of Allowance received for Taiwan Patent Application No. 97147638, mailed on Apr. 3, 2014, 2 Pages of Notice of Allowance and 1 Page of English Translation.

* cited by examiner

DELIVERING SECURED MEDIA USING A PORTABLE MEMORY DEVICE

TECHNICAL FIELD

The inventions generally relate to delivering secured media using a portable memory device.

BACKGROUND

Flash memory devices such as memory cards typically have a single relatively slow speed interface. Additionally, all of the content on the flash memory device is visible via that interface, and there are no supporting features to provide content protection in order to provide, for example, entertainment content to a user that is secured and/or is protected from a user attempting to misuse the content.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Some embodiments of the inventions relate to delivering secured media using a portable memory device.

In some embodiments an interface of a portable memory device is used to store content information in a hidden memory region of the portable memory device. The interface is also used to store information in a visible memory region of the portable memory device. The information stored in the visible memory region allows the content information stored in the hidden memory region to be accessed.

In some embodiments a portable memory device includes a hidden memory region and a visible memory region. An interface of the portable memory device is to store content information in the hidden memory region (in some embodiments in a "write only" manner). The interface also is to store information in the visible memory region. The information stored in the visible memory region is used to access the content information in the hidden memory region.

In some embodiments an article includes a computer readable medium having instructions thereon which when executed cause a computer to store content information in a hidden memory region of a portable memory device using an interface of the portable memory device, and to store information in a visible memory region of the portable memory device using the interface. The information stored in the visible memory region allows the content information stored in the hidden memory region to be accessed.

Figure 1:
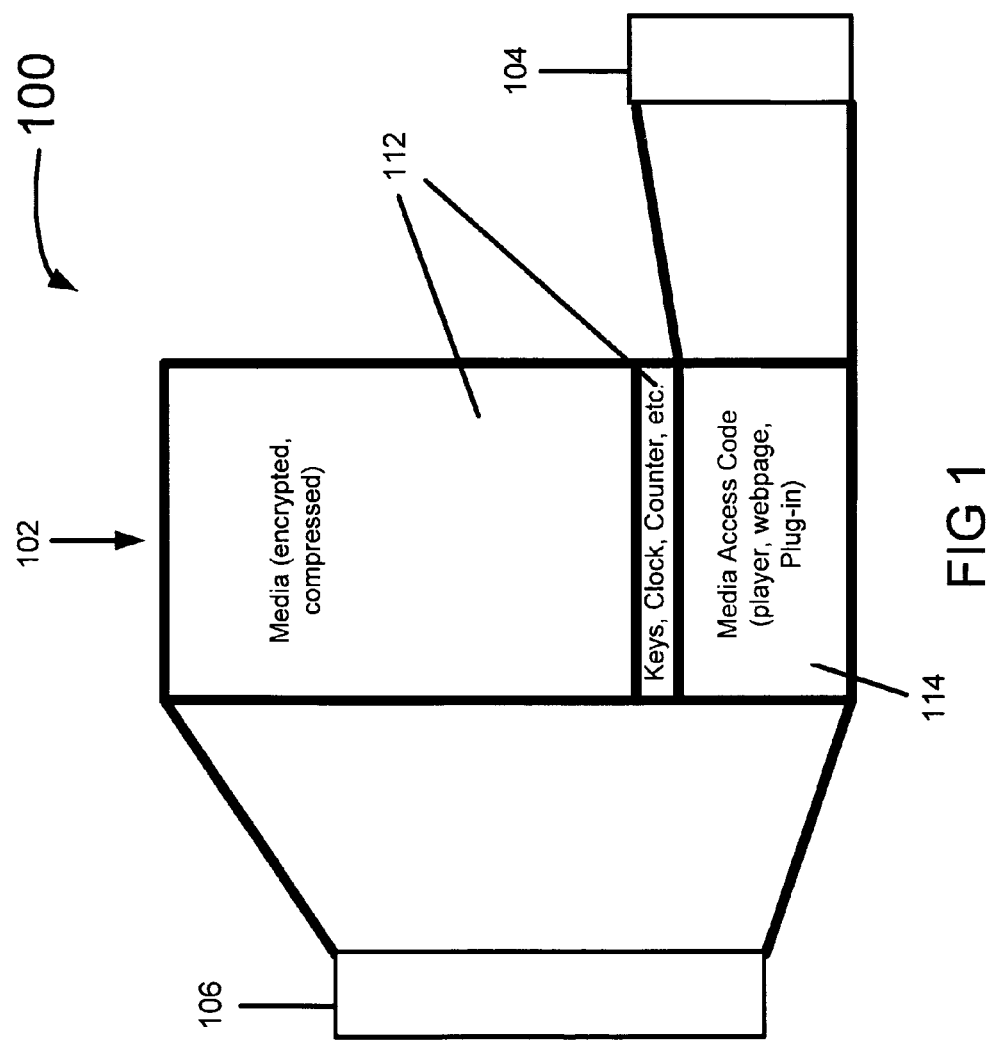
FIG. 1 illustrates a memory device according to some embodiments of the inventions.

FIG. 1 illustrates a memory device 100 according to some embodiments. In some embodiments memory device 100 is a flash memory device and/or a memory card and/or a flash card. In some embodiments memory device 100 is a portable memory device. Memory device 100 includes a memory map (for example, a flash memory map) 102, a first interface 104 and a second interface 106. In some embodiments, first interface 104 is a higher speed interface than the second interface 106. For example, in some embodiments interface 106 is a USB and/or a USB2 interface. In some embodiments second interface 104 is a high speed interface (for example, a fast flash interface, a Serial Advanced technology Attachment or SATA interface, and/or a high speed USB interface such as a USB3 interface, etc). In some embodiments interface 104 is a high speed interface operating at very high read and/or write speeds (for example, at 300 MBps or higher, which could load approximately two hours of High Definition (HD) content in a minute. Memory map 102 includes a hidden memory region 112 and a visible memory region 114. Hidden memory region 112 may be used, for example, to store media (for example, encrypted and/or compressed media and/or entertainment media such as movies, etc.) Hidden memory region 112 may also be used, for example, to store keys, a clock, a counter, etc. Visible memory region 114 may be used, for example, to store a Media Access Code and/or a media player, a web page, a plug-in, etc.

In some embodiments, access to the hidden memory region 112 of the memory map 102 is enforced differently at the first interface 104 and the second interface 106. In some embodiments, the first (higher speed) interface 104 is controlled, for example, by the content supplier, who supplies, among other things media content and a Media Access Code to the memory map 102. In some embodiments, the second interface 106 is a standard storage device interface (for example, a standard USB2 storage device interface). In some embodiments, the second interface 106 only has read access to the visible memory region 114 and does not have any access to the hidden memory region 112. The code contained in the visible memory region 114 is run or used to tightly control access to the hidden media content included in hidden memory region 112.

As described above in some embodiments the memory card 100 includes two interfaces. This includes in some embodiments a very high speed interface 104 optimized to rapidly write data into the memory map 102 of the memory device, and also includes in some embodiments a slower interface 106 (for example, a USB2 interface) to supply media from the memory device 100 to a media player. In some embodiments memory device 100 includes a controller (not illustrated in FIG. 1) such as a flash controller. The controller of the memory device 100 is used in some embodiments to enforce several policies to ensure that any media (for example, such as a movie) on the memory device 100 will be secure from theft or tampering, for example.

In some embodiments the controller of the memory device 100 performs several different functions of controlling the interfaces 104 and 106 and/or controlling portions of the memory map 102, etc. as set forth below. In some embodiments the high speed interface 104 (which may in some embodiments be a write only interface and in other embodiments may be a read interface and a write interface) is used to load the memory map 102 of the memory device 100 (for example, to load an entire movie onto the memory device 100 in a minute). In some embodiments the interface 104 into the hidden memory region 112 is an interface with write only access. In some embodiments most or all of the memory map locations 102 of the memory device 100 are scrubbed prior to writing new data thereon. In some embodiments most or all of the hidden memory region locations 112 are scrubbed prior to writing new data thereon. In some embodiments most or all of the visible memory region locations 112 are scrubbed prior to writing new data thereon. In some embodiments a single atomic write sequence fills both the visible and hidden portions 114 and 112 of the memory map 102. In some embodiments a single atomic write sequence fills the hidden portion 112 of the memory map 102. In some embodiments a single atomic write sequence fills the hidden portion 112 of the memory map 102. In some embodiments a single atomic write sequence fills the hidden portion 112 of memory map 102 and a separate single atomic write sequence fills the visible portion 114 of memory map 104. In some embodiments these two atomic write sequences are performed in a sequential manner. In some embodiments these two atomic write sequences are performed in an interleaved manner.

In some embodiments the second interface 106 is only allowed to access a programmable visible region 114 of the memory map 102. In some embodiments this access may be read or read-write, in some embodiments depending on the Digital Rights Management (DRM) policy of the content provider. In some embodiments APIs (Application Programming Interfaces) are provided with application code to cross the boundary between the hidden memory region 112 and the visible memory region 114 as well as to manage security features (for example, return content from hidden memory, a clock feature so that content expires, a monotonic counter to count uses and then to expire, and/or various keys). In some embodiments other cryptographic features and/or some security primitives or other functions are included in the memory map 102 such as, for example, a hardware decompress and/or decrypt that does partial or complete work on the data.

In some embodiments, the visible memory region 114 of the memory map 102 includes a file, an application, a media player, an API, and/or some other code that is able to cross the border between the visible memory region 114 and the hidden memory region 112 to access the content information stored in the hidden memory region 112 of the memory map 102. In some embodiments the visible memory region 114 of memory map 102 contains a file system that includes code that is used to access the media stored in the hidden region 112 of the memory 102. In some embodiments, the visible region 114 stores, for example, publicly visible content such as adds, coupons, special features, etc. The visible region 114 also includes in some embodiments one or more specific mechanisms to extract the content from the hidden region 112 of the memory 102 and make that content visible to a media player device via the interface 106. In some embodiments the visible region 114 also includes some or all of the media renderer that may be delivered in multiple forms (for example, media player executable code, a web page that delivers a media stream to a Windows Media Player, RealPlayer®, Quick-Time, and/or a proprietary player, for example, and/or a media player plug-in such as a Windows Media Player plug-in).

In some embodiments the hidden memory region 112 contains the media, which is not visible in the limited file system exposed by the interface 106. The format, encryption, compression, and/or other DRM, etc. is as strong as required by the media supplier, and the media renderer in the visible region 114 contains the secret information needed to unwrap it. The hidden memory portion 112 also includes in some embodiments any keys, serial numbers, and/or other identifying marks such as point of sale, etc.

While FIG. 1 has been described in reference to two interfaces 104 and 106, it is noted that in some embodiments only one interface may be necessary. Further, it is noted that in some embodiments interfaces 104 and 106 are two different physical interfaces. However, in some embodiments interfaces 104 and 106 are two different logical interfaces (for example, in some embodiments interfaces 104 and 106 are two different logical interfaces within one physical interface).

In some embodiments, memory device 100 is a new class of memory device with features that allow it to be used in a media content rental and/or sale arrangement. While previous memory devices have a single rather slow speed interface, all content on them is visible, and there are no supporting features to support content protection, the memory device 100 allows a new use to be made out of memory devices such as fast flash memory cards, for example. In some embodiments the features of memory device 100 not only provide high quality content protection, but they also are very flexible in providing the content provider with a flexible platform to upgrade their DRM and to continue to protect intellectual property rights of their content.

Figure 2:
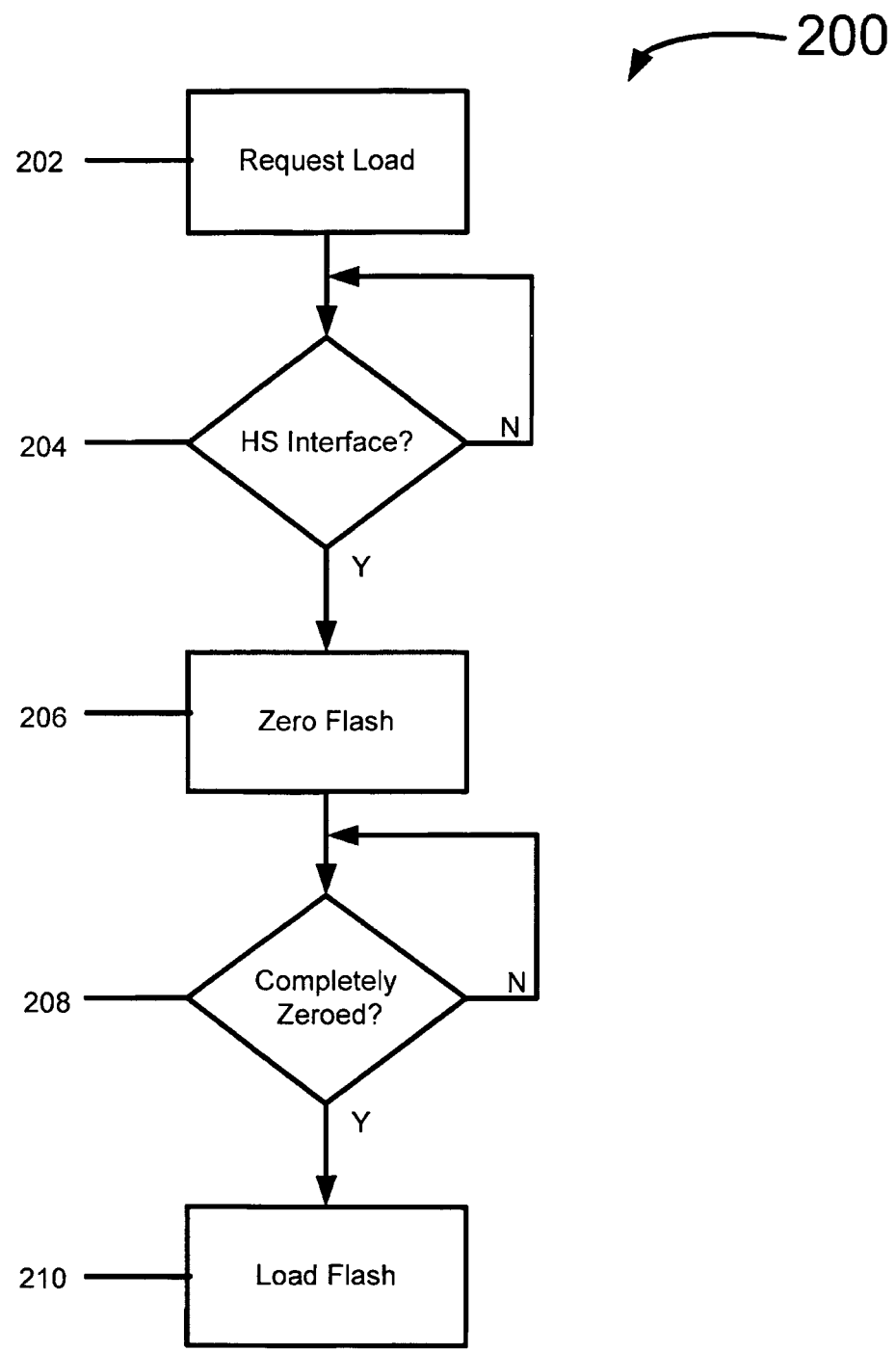
FIG. 2 illustrates a flow according to some embodiments of the inventions.

FIG. 2 illustrates a flow 200 according to some embodiments. Flow 200 illustrates a mechanism that a memory device can use to prevent a hostile attack at a high speed interface (for example, in some embodiments by making the interface write only, zeroing out or scrubbing the contents before loading the memory device in one atomic operation). At 202 a load of a memory device is requested. At 204 a determination is made as to whether the load request is made via a high speed interface (such as interface 104 rather than interface 106, for example). If it is not made via a high speed interface flow stays at 204. If it is made via a high speed interface then the memory device (for example, in some embodiments a flash memory device) is zeroed, erased, scrubbed, etc. at 206. At 208 a determination is made as to whether the memory device has been completely zeroed. If not, flow remains at 208 until the zeroing has been completed. Once the memory device has been completely zeroed then the memory device (in some embodiments a flash memory device) is loaded at 210.

Figure 3:
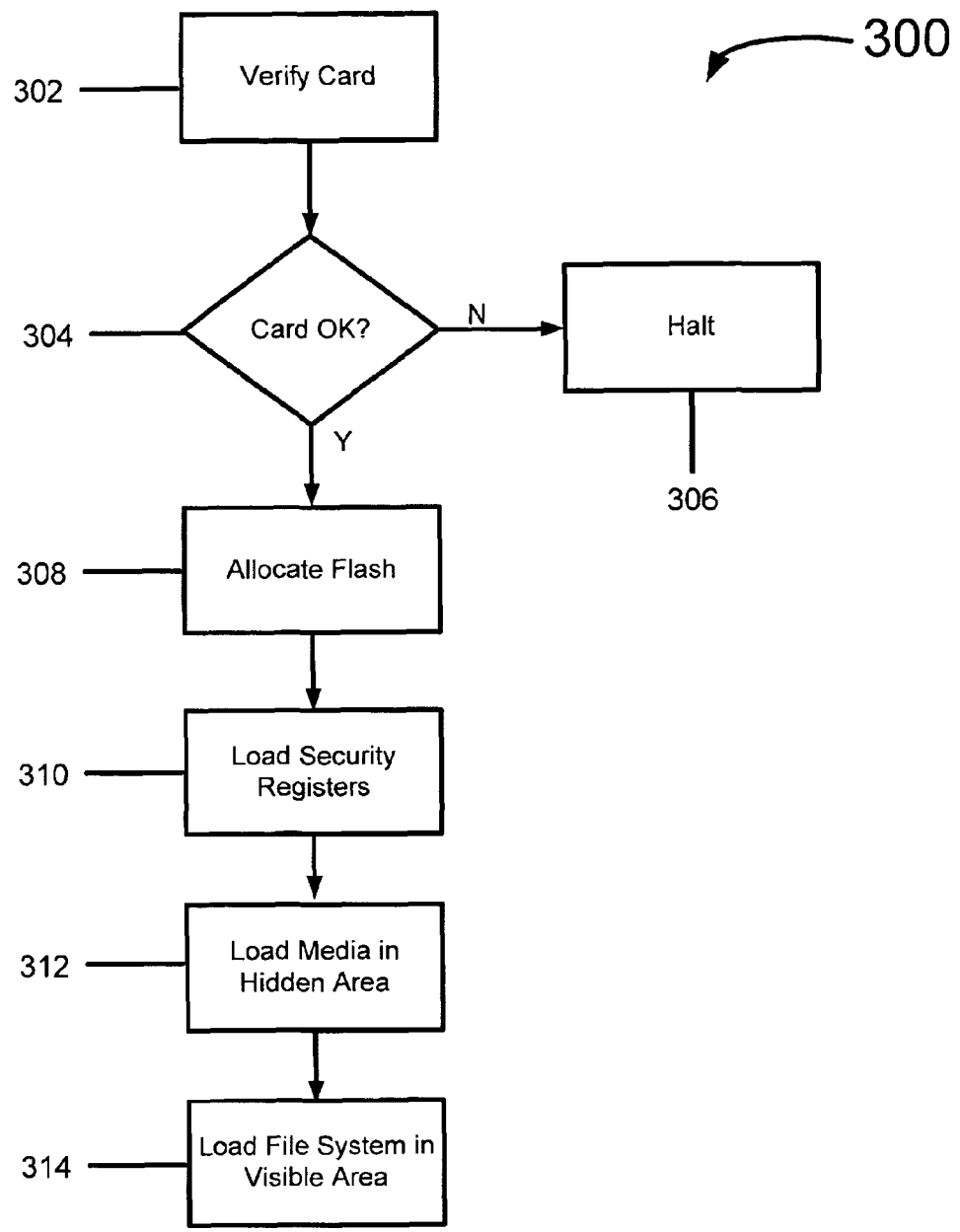
FIG. 3 illustrates a flow according to some embodiments of the inventions.

FIG. 3 illustrates a flow 300 according to some embodiments. According to some embodiments flow 300 illustrates a procedure of loading a memory device (for example, a procedure of loading a flash memory device). For example, in some embodiments flow 300 represents the procedure of loading a memory device as implemented at 210 in FIG. 2. At 302 the memory device (and/or memory card and/or flash memory device) is verified. Then at 304 a determination is made as to whether the memory device is OK. For example, 304 determines according to some embodiments whether the memory device has been tampered with, whether or not it is an authorized memory device, etc. If the memory device is not OK at 304 then flow 300 is halted at 306. If the memory device is OK at 304 then the memory device is allocated at 308. For example, at 308 according to some embodiments hidden and visible memory regions are established in the memory device. Security registers of the memory device are loaded at 310. For example, in some embodiments the security registers are in the hidden memory region of the memory device and/or the security registers store information such as keys, counts, clock information, ID information, etc. Media is loaded in the hidden memory area of the memory device at 312. Then a file system is loaded in the visible memory region at 314.

Figure 4:
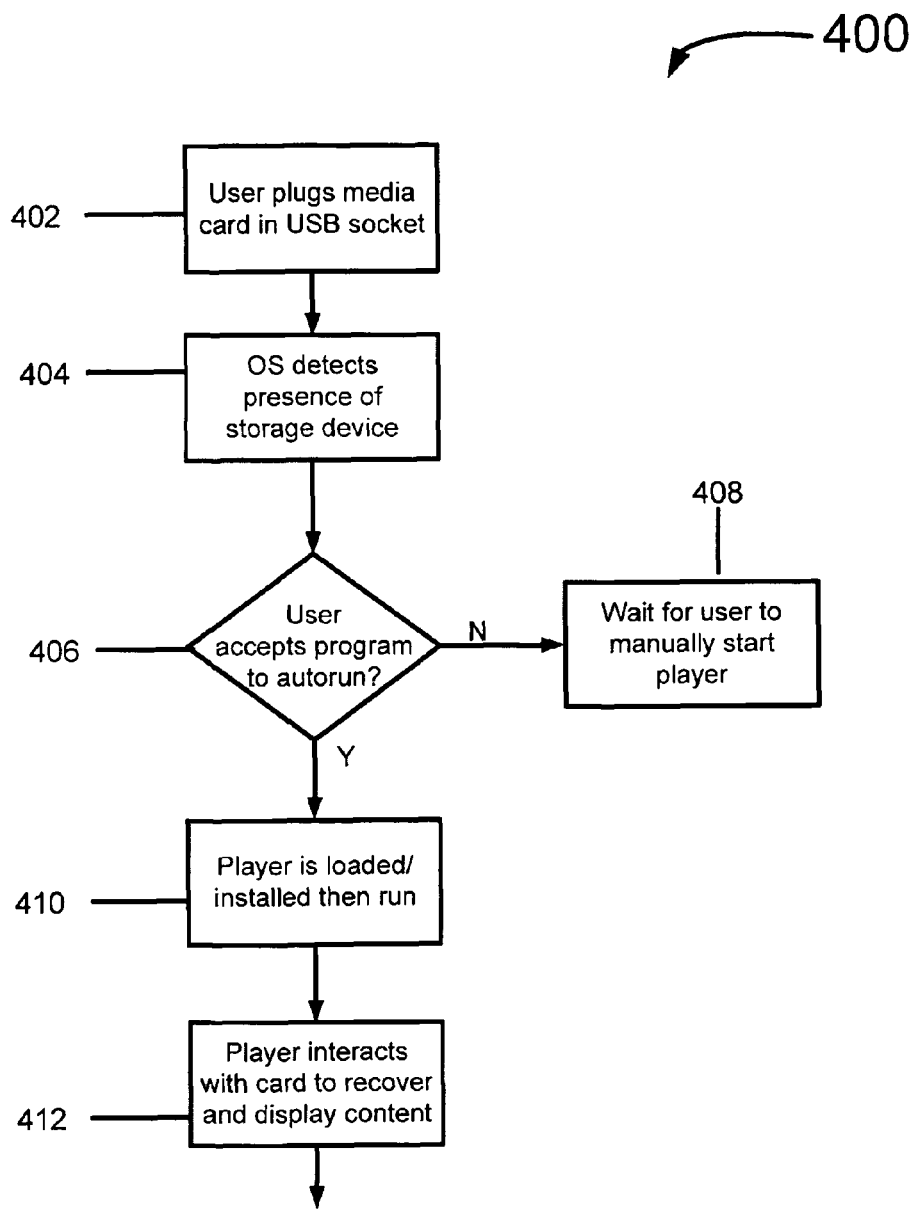
FIG. 4 illustrates a flow according to some embodiments of the inventions.

FIG. 4 illustrates a flow 400 according to some embodiments. At 402 a user plugs a memory device (for example, a media card) into another device (such as a computer or another type of media player device) via an interface of the other device (for example, plugs the card into a USB socket via a USB interface of the memory device). At 404 an Operating System (OS) or other software or hardware of the other device detects a presence of the memory device at the interface and/or socket. At 406 a decision is made as to whether a user has accepted a program to autorun once the memory device has coupled to the other device. If the user has not accepted an autorun at 406, the flow 400 waits for the user to manually start the media player at 408. If the user has accepted an autorun at 406, a media player is loaded and/or installed and begins to run at 410. At 412 the media player interacts with the memory device to securely recover and display content from the memory device (for example, content from a hidden memory region of the memory device).

In some embodiments flow 400 illustrates one or many possible operations that may be used to play media according to some embodiments (for example, in some embodiments to play media on a computer such as a PC). It is noted that the form that a media player takes and how data is securely recovered from a memory device vary dramatically according to some embodiments, for example depending on the specific player model and the specific security models used. According to some embodiments various software hooks and mechanisms are provided to implement a wide variety of solutions according to a variety of embodiments.

Figure 5:
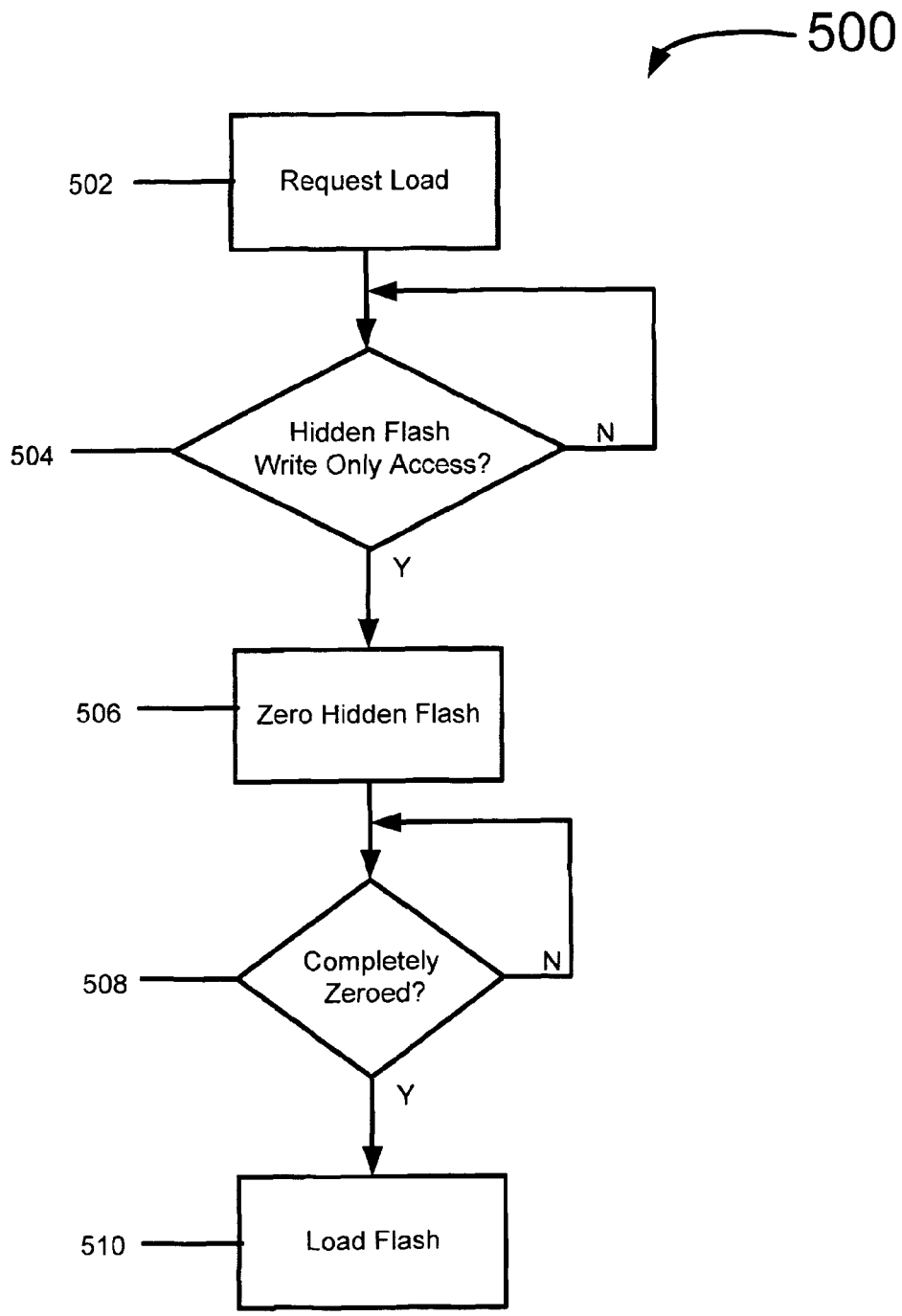
FIG. 5 illustrates a flow according to some embodiments of the inventions.

FIG. 5 illustrates a flow 500 according to some embodiments. In FIG. 5, Flow 200 illustrates a mechanism that a memory device can use to prevent a hostile attack at a high speed interface (for example, in some embodiments by making the interface write only, and/or by zeroing out or scrubbing the contents before loading the memory device in one atomic operation). Particularly as we move toward higher speed interfaces such as USB 3.0, for example, as this high speed interface, in some embodiments only that one high speed interface is used. For example, in such embodiments an API or other information, applications, code, etc. are used to access the hidden memory region the access is write only and optionally performs an erase operation prior to the writing of the content information. This allows use of a single high speed interface while protecting the hidden memory region by allowing write only access through a portal, for example. In some embodiments such a portal can be a file (or dummy file, for example) that appears in the visible memory region, and although it is referred to as a "portal" it is really not a portal as typically defined. In any case, an open operation then in some embodiments forces an erase of the hidden memory region and the write operation ignores the block/sector operation and treats the write data as a stream and loads it into the hidden area.

In any case, at 502 of flow 500 of FIG. 5, a load of a memory device is requested. At 504 a determination is made as to whether the load request is a write only load request. If it is not a write only load request then flow stays at 504. If it is a write only load request then the memory device (for example, in some embodiments a flash memory device) is zeroed, erased, scrubbed, etc. at 506. At 508 a determination is made as to whether the memory device has been completely zeroed. If not, flow remains at 508 until the zeroing has been completed. Once the memory device has been completely zeroed then the memory device (in some embodiments a flash memory device) is loaded at 510.

According to some embodiments a memory device includes two different interfaces that allow different performance characteristics. In some embodiments the two different interfaces are never used to access the memory device simultaneously.

In some embodiments a consumer brings their memory device to a retail or other location and uses the memory device to rent and/or buy media content without the need to ever return anything (since, for example, a counter and/or timer may be implemented within the memory device). This is implemented according to some embodiments in a secure and content protective manner.

Although some embodiments have been described herein as being flash memory related and/or media card related, for example, according to some embodiments these particular implementations may not be required and any memory device may be used.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A portable memory device comprising:
a first interface;
a second interface that is a standard interface, wherein the first interface and the second interface are to operate simultaneously;
wherein the first interface has a higher interface speed than the second interface, and wherein the first interface is to transfer media content to a hidden memory region of the portable memory device using the higher interface speed, and wherein the second interface is to provide access to the media content separately from the first interface.

2. The portable memory device of claim 1, further comprising:
a second memory region;
wherein the first interface is to store content information in the hidden memory region and to store information in the second memory region, and wherein the information stored in the second memory region allows the content information stored in the hidden memory region to be accessed.

3. The portable memory device of claim 2, wherein the second memory region is a visible memory region.

4. The portable memory device of claim 2, wherein the first interface is further to read the information from the second memory region in order to provide the content information from the hidden memory region to a media player to be coupled to the portable memory device via the first interface while maintaining content protection of the content information.

5. The portable memory device of claim 2, wherein the second interface is to read the information from the second memory region in order to provide the content information from the hidden memory region to a media player to be coupled to the portable memory device via the second interface while maintaining content protection of the content information.

6. The portable memory device of claim 5, wherein the first interface is an interface to be used only by a supplier of the content information to be stored in the hidden memory region of the portable memory device.

7. The portable memory device of claim 2, wherein the first interface is an interface to be used by a user to play the content information stored in the hidden memory region of the portable memory device while maintaining content protection of the content information.

8. The portable memory device of claim 2, the first interface to scrub the hidden memory region prior to storing the content information in the hidden memory region.

9. The portable memory device of claim 2, wherein the first interface is to store the content information in the hidden memory region using one atomic operation.

10. The portable memory device of claim 2, wherein the first interface has write only access to the hidden memory region.

11. The portable memory device of claim 1, wherein the portable memory device is a flash memory device.

12. The portable memory device of claim 1, wherein the first interface is at least one of a fast flash interface, a SATA interface, and/or a USB interface.

13. The portable memory device of claim 1, wherein the first interface and the second interface do not allow simultaneous access of the portable memory device.

14. A portable memory device comprising:
a hidden memory region to store media content;
a first interface to the hidden memory region having a first interface speed;
a second interface that is a standard interface having a second interface speed, wherein the first interface speed is a higher interface speed than the second, standard interface speed, and the second interface is to provide access to the media content separately from the first interface, and wherein the first interface and the second interface are to operate simultaneously.

15. The portable memory device of claim 14, wherein the first interface is further to read information from the portable memory device in order to provide the media content from the hidden memory region to a media player to be coupled to the portable memory device via the first interface while maintaining content protection of the media content.

16. The portable memory device of claim 14, wherein the first interface is an interface to be used only by a supplier of the media content to be stored in the hidden memory region of the portable memory device.

17. The portable memory device of claim 14, wherein the first interface is an interface to be used by a user to play the media content stored in the hidden memory region of the portable memory device while maintaining content protection of the media content.

18. The portable memory device of claim 14, wherein the portable memory device is a flash memory device.

19. The portable memory device of claim 14, wherein the first interface does not allow simultaneous access of the portable memory device with any other interface.

20. The portable memory device of claim 14, the first interface to scrub the hidden memory region prior to storing the media content in the hidden memory region.

21. The portable memory device of claim 14, wherein the first interface is to store the media content in the hidden memory region using one atomic operation.

22. The portable memory device of claim 14, wherein the first interface has write only access to the hidden memory region.

23. A method comprising:
receiving media content in a hidden memory region of a portable memory device using a first interface that has a higher interface speed than a second standard interface of the portable memory device, wherein the second standard interface is to provide access to the media content separately from the first interface, and wherein the first interface and the second standard interface are to operate simultaneously.

24. The method of claim 23, further comprising information from the portable memory device using the first interface and providing the media content from the hidden memory region to a media player to be coupled to the portable memory device via the first interface while maintaining content protection of the media content.

25. The method of claim 23, further comprising allowing the first interface to be used only by a supplier of the media content to be stored in the hidden memory region of the portable memory device.

26. The method of claim 23, further comprising allowing the first interface to be used by a user to play the media content stored in the hidden memory region of the portable memory device while maintaining content protection of the media content.

27. The method of claim 23, wherein the portable memory device is a flash memory device.

28. The method of claim 23, further comprising not allowing simultaneous access of the portable memory device of the first interface and any other interface.

29. The method of claim 23, further comprising scrubbing the hidden memory region prior to storing the media content in the hidden memory region.

30. The method of claim 23, further comprising storing the media content in the hidden memory region using one atomic operation.

31. The method of claim 23, further comprising allowing the first interface to have write only access to the hidden memory region.

32. An apparatus comprising:
an interface to provide media content to a hidden memory region of a portable memory device, wherein the interface has a higher interface speed than a second standard interface of the portable memory device and the second standard interface is to provide access to the media content separately from the interface, wherein the interface and the second standard interface are to operate simultaneously.

33. The apparatus of claim 32, wherein the interface is further to read information from the portable memory device in order to provide the media content from the hidden memory region to a media player to be coupled to the portable memory device via the interface while maintaining content protection of the media content.

34. The apparatus of claim 32, wherein the interface is an interface to be used only by a supplier of the media content to be stored in the hidden memory region of the portable memory device.

35. The apparatus of claim 32, wherein the interface is an interface to be used by a user to play the media content stored in the hidden memory region of the portable memory device while maintaining content protection of the media content.

36. The apparatus of claim 32, wherein the portable memory device is a flash memory device.

37. The apparatus of claim 32, wherein the interface does not allow simultaneous access of the portable memory device with the second interface.

38. The apparatus of claim 32, the interface to scrub the hidden memory region prior to storing the media content in the hidden memory region.

39. The apparatus of claim 32, wherein the interface is to store the media content in the hidden memory region using one atomic operation.

40. The apparatus of claim 32, wherein the interface has write only access to the hidden memory region.

41. A method comprising:
providing media content to a hidden memory region of a portable memory device using a first interface that has a higher interface speed than a second standard interface of the portable memory device, wherein the second standard interface is to provide access to the media content separately from the interface, and wherein the first interface and the second standard interface are to operate simultaneously.

42. The method of claim 41, further comprising reading information from the portable memory device using the first interface, and providing the media content from the hidden memory region to a media player to be coupled to the portable memory device via the first interface while maintaining content protection of the media content.

43. The method of claim 41, further comprising allowing the first interface to be used only by a supplier of the media content to be stored in the hidden memory region of the portable memory device.

44. The method of claim 41, further comprising allowing the first interface to be used by a user to play the media content stored in the hidden memory region of the portable memory device while maintaining content protection of the media content.

45. The method of claim 41, wherein the portable memory device is a flash memory device.

46. The method of claim 41, further comprising not allowing simultaneous access of the portable memory device of the first interface and any other interface.

47. The method of claim 41, further comprising scrubbing the hidden memory region prior to storing the media content in the hidden memory region.

48. The method of claim 41, further comprising storing the media content in the hidden memory region using one atomic operation.

49. The method of claim 41, further comprising allowing the first interface to have write only access to the hidden memory region.

* * * * *